US008663830B2

(12) United States Patent
Hsiao et al.

(10) Patent No.: US 8,663,830 B2
(45) Date of Patent: Mar. 4, 2014

(54) BATTERY DEVICE AND BATTERY DEVICE MODULE

(75) Inventors: Yuan-Kun Hsiao, Taoyuan Hsien (TW); Po-Lin Pan, Taoyuan Hsien (TW)

(73) Assignee: Delta Electronics, Inc. (TW)

( * ) Notice: Subject to any disclaimer, the term of this patent is extended or adjusted under 35 U.S.C. 154(b) by 196 days.

(21) Appl. No.: 13/309,788

(22) Filed: Dec. 2, 2011

(65) Prior Publication Data

US 2013/0022855 A1 Jan. 24, 2013

(30) Foreign Application Priority Data

Jul. 18, 2011 (TW) .............................. 100125301 A

(51) Int. Cl.
*H01M 10/50* (2006.01)
(52) U.S. Cl.
USPC ......................................................... 429/120
(58) Field of Classification Search
None
See application file for complete search history.

(56) References Cited

U.S. PATENT DOCUMENTS

| 5,567,544 | A | 10/1996 | Lyman |
| 7,310,225 | B2 | 12/2007 | Ha |
| 7,648,538 | B2 | 1/2010 | Oogami |
| 2005/0231158 | A1 | 10/2005 | Higashino |
| 2008/0113263 | A1 | 5/2008 | Cummins |
| 2009/0258288 | A1 | 10/2009 | Weber et al. |
| 2009/0325054 | A1 | 12/2009 | Payne et al. |
| 2010/0119928 | A1 | 5/2010 | Yoon |
| 2010/0279154 | A1 | 11/2010 | Koetting et al. |
| 2011/0027640 | A1 | 2/2011 | Gadawski et al. |

FOREIGN PATENT DOCUMENTS

| TW | 530430 | 5/2003 |
| TW | 544963 | 8/2003 |
| TW | I286851 | 9/2007 |
| TW | M403114 U1 | 5/2011 |

OTHER PUBLICATIONS

Decision to Grant Patent of Taiwan 10221555570, mailed Nov. 14, 2013, (see attached English Language Summary).

*Primary Examiner* — Milton I Cano
*Assistant Examiner* — Carmen Lyles-Irving
(74) *Attorney, Agent, or Firm* — Cantor Colburn LLP

(57) ABSTRACT

A battery device is provided, which includes a fixing frame, a battery and a heat dissipating structure. The fixing frame includes a first plane, a second plane and a third plane. The first plane stands apart from the second plane, and the third plane connects the first plane and second plane. A receiving space is formed between the first and the second planes. The battery is disposed in the receiving space. The heat dissipating structure includes a plate and a block connected to the plate. The plate is disposed on the second plane and comes into contact with the battery. The block is disposed on the third plane and has an input hole and an output hole for liquid to pass therethrough. With this arrangement, the heat dissipating structure can quickly dissipate heat from the battery by the liquid flow. A battery device module is also provided in this disclosure.

17 Claims, 15 Drawing Sheets

BATTERY DEVICE AND BATTERY DEVICE MODULE

CROSS-REFERENCES TO RELATED APPLICATIONS

This application claims the benefit of the priority to Taiwan Patent Application No. 100125301 filed on Jul. 18, 2011, the disclosures of which are incorporated herein by reference in their entirety.

BACKGROUND OF THE INVENTION

1. Field of the Invention

The present invention relates to a battery device and a battery device module, both of which have a water-cooling heat dissipating structure.

2. Descriptions of the Related Art

Many electronic products must be powered by a battery device to operate. However, battery devices generate heat when outputting the electric power, and if the heat is not effectively dissipated, it will accumulate in the battery device and possibly cause failure in the performance of the battery device. Therefore, effective heat dissipation is very important for the operation and service life of the battery device.

Most conventional practices of solving the problem of heat dissipation in a battery device are to dispose a plurality of heat dissipating fins on the battery device so that the heat can be dissipated through convection between the heat dissipating fins and the ambient air. However, the convection between the heat dissipating fins and the ambient air only provides a low heat dissipation efficiency, and even when fans are additionally provided near the heat dissipating fins to blow air towards the heat dissipating fins, improvement to the heat dissipation effect is still limited and, on the other hand, both the cost and the space occupation of the battery device will be increased.

In view of this, a solution that dissipates heat from the battery device through water cooling has been proposed. For example, according to U.S. Patent No. US 2009/0258288, a water-cooling plate is used to carry heat away from the battery device. However, although the water-cooling plate can dissipate heat quickly, the geometry thereof causes the thickness of the battery device to become significantly larger.

Accordingly, an urgent need exists in the art to provide a solution that can improve the heat dissipation efficiency of the battery device without significantly increasing the thickness of the battery device.

SUMMARY OF THE INVENTION

An objective of the present invention is to provide a battery device and a battery device module which are provided with a heat dissipating structure. The heat dissipating structure allows for liquid to flow therethrough to carry the heat away from the battery device quickly, but does not significantly increase the thickness of the battery device.

To achieve the aforesaid objective, the battery device of the present invention comprises a fixing frame, a battery and a heat dissipating structure. The fixing frame has a first plane, a second plane and a third plane. The first plane is set apart from the second plane, the third plane connects the first and the second planes, and a receiving space is formed between the first and the second planes. The battery is disposed in the receiving space of the fixing frame. The heat dissipating structure includes a plate and a block connecting to the plate. The plate is thinner than the block and is disposed on the second plane of the fixing frame, coming into contact with the battery. The block is disposed on the third plane of the fixing frame and has a first input hole and a first output hole.

Also to achieve the aforesaid objective, the battery device module of the present invention comprises a plurality of aforesaid battery devices and a fixing device. The battery devices are stacked on top of each other. The first input holes of the battery devices communicate with each other, while the first output holes of the battery devices communicate with each other. The fixing device provides a clamping force for the battery devices to stay stacked on top of each other.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
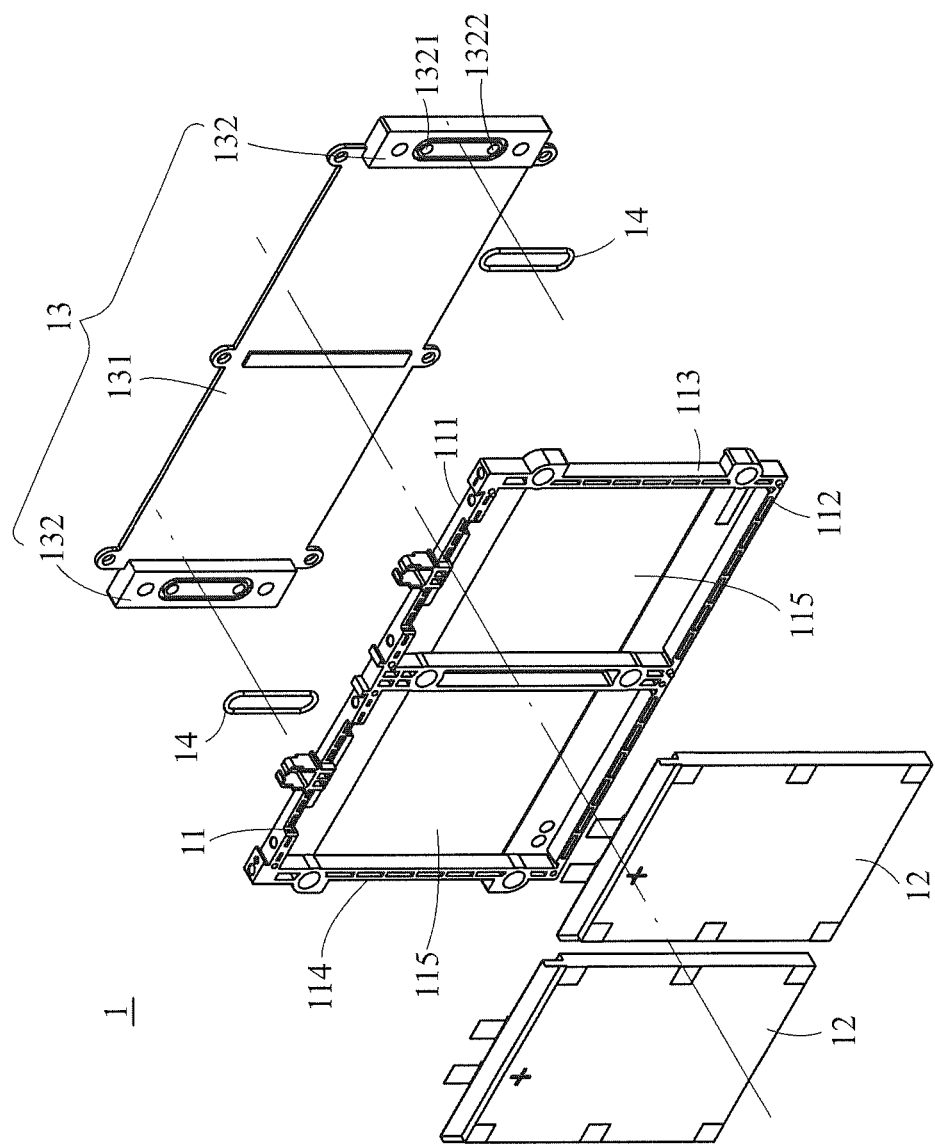
FIG. 1 is a perspective exploded view of a battery device according to the first embodiment of the present invention.
Figure 2:
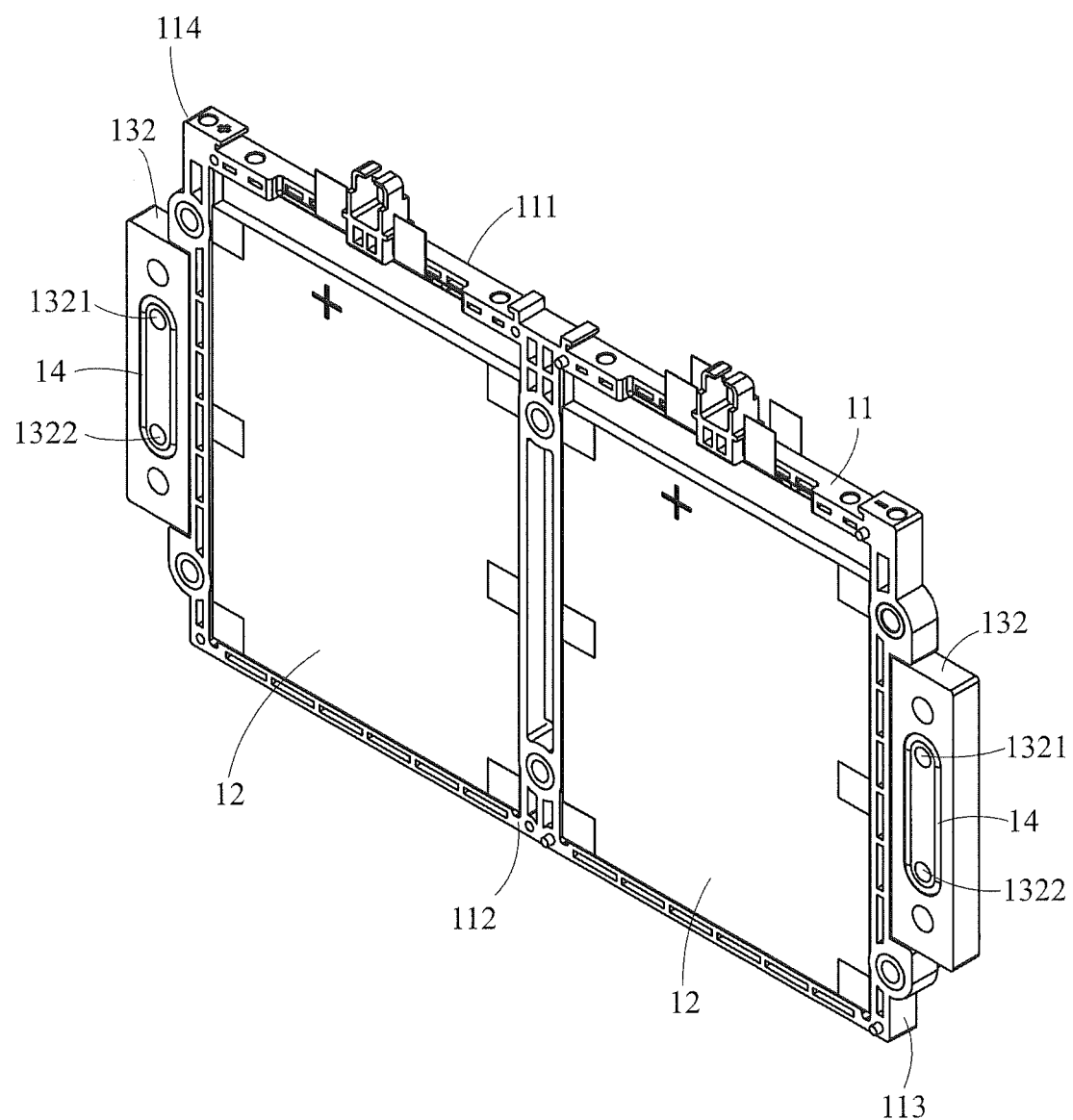
FIG. 2 is a perspective assembly view of the battery device according to the first embodiment of the present invention.
Figure 3:
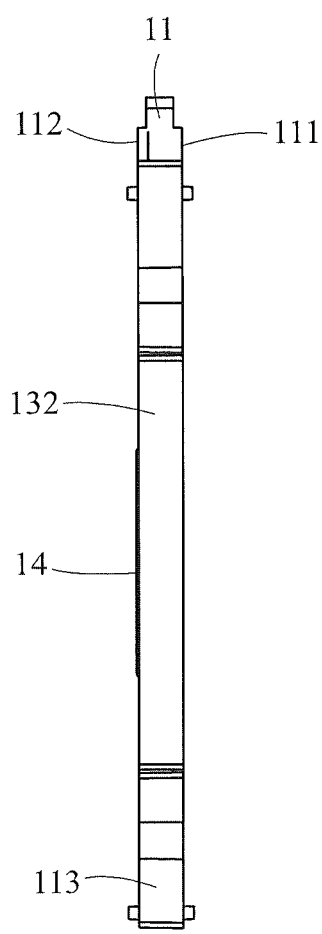
FIG. 3 is a side view of the battery device according to the first embodiment of the present invention.

Referring to FIGS. 1 to 3, a perspective exploded view, a perspective assembly view and a side view of a battery device 1 according to the first embodiment of the present invention are shown therein respectively. The battery device 1 comprises a fixing frame 11, at least one battery 12, a heat dissipating structure 13 and two seal rings 14. Hereinbelow, these components will be described in sequence.

The fixing frame 11 is adapted to support and fix the battery 12. The fixing frame 11 is substantially of a rectangular plate form, and may have a first plane 111, a second plane 112, a third plane 113 and a fourth plane 114. The first plane 111 is set apart from the second plane 112, while the third plane 113 is set apart from the fourth plane 114. The third plane 113 connects to the first plane 111 and the second plane 112. The fourth plane 114 connects to the first plane 111 and the second plane 112 too.

In this embodiment, the first plane 111, the second plane 112, the third plane 113 and the fourth plane 114 are the back plane, the front plane, the right plane and the left plane of the fixing frame 11 respectively. Additionally, a receiving space 115 is formed between the first plane 111 and the second plane 112.

The battery 12 is adapted to store and release electric energy, and is approximately of a rectangular plate form. The battery 12 may be disposed within the receiving space 115 of the fixing frame 11 with at least one side (e.g., the back side) of the battery 12 being exposed outside the fixing frame 11. In this embodiment, both the front side and the back side of the battery 12 are exposed outside the fixing frame 11, so the back side and the front side of the battery 12 can be seen via the first plane 111 and the second plane 112 of the fixing frame 11 respectively.

It shall be appreciated that there are two batteries 12 in this embodiment, which are disposed within the receiving space 115 side by side. However, the number of batteries 12 can be increased or decreased readily by those of ordinary skill in the art depending on needs for supply power, and the size and the profile of the receiving space 115 of the fixing frame 11 can be adjusted according to the number of batteries 12.

The heat dissipating structure 13 is used to dissipate heat from the batteries 12, and may be made of a material with a high thermal conductivity, such as aluminum, copper, ceramics or the like. The heat dissipating structure 13 may comprise a plate 131 and two blocks 132 connecting to the plate 131. The two blocks 132 are disposed on the left and right side of the plate 131 respectively. Additionally, the plate 131 is thinner than the blocks 132, and is integrally formed with the blocks 132. Each of the blocks 132 has a first input hole 1321 and a first output hole 1322, which are spaced apart from each other, for the liquid to flow therethrough.

When the fixing frame 11 and the battery 12 are assembled together, the plate 131 is disposed on the first plane 111 of the fixing frame 11. This means that the plate 131 may abut on the first plane 111, be recessed into the first plane 111 or be spaced apart from the first plane 111 by an interval; in this embodiment, the plate 131 abuts on the first plane 111. The plate 131 makes further contact with the batteries 12; in more detail, because the back side of each of the batteries 12 is partially exposed out of the fixing frame 11, the plate 131 can come into contact with the back side of each of the batteries 12.

The two blocks 132 are disposed on the third plane 113 and the fourth plane 114 of the fixing frame 11 respectively. This means that the blocks 132 may abut on the third plane 113 (and the fourth plane 114), be recessed into the third plane 113 (and the fourth plane 114) or be spaced apart from the third plane 113 (and the fourth plane 114) by an interval; in this embodiment, the blocks 132 are spaced apart from the third plane 113 (and the fourth plane 114) by an interval.

Furthermore, the blocks 132 may be disposed between the first plane 111 and the second plane 112 of the fixing frame 11 without protruding out of the first plane 111 and the second plane 112; in other words, each of the blocks 132 has a thickness that is not larger than the thickness (i.e., the shortest distance between the first plane 111 and the second plane 112) of the fixing frame 11. Thus, the overall thickness of the battery device 1 will not be significantly increased due to the disposition of the blocks 132.

Next, the heat dissipation mechanism of the heat dissipating structure 13 will be described. The batteries 12 will generate heat when outputting the electric power. Because the plate 131 of the heat dissipating structure 13 comes into contact with the batteries 12, the heat generated by the batteries 12 can be transferred to the plate 131 through the heat transferring mechanism. The heat transferred to the plate 131 will be further transferred to the blocks 132. As the low-temperature liquid flows through the first input hole 1321 and the first output hole 1322 of each of the blocks 132 continuously, the heat from the blocks 132 can be carried away by the liquid. In this way, it is difficult for the heat to accumulate in the batteries 12 and the heat dissipating structure 13, so the temperature of the batteries 12 will not rise too rapidly.

It shall be appreciated that to enhance the heat dissipation effect of the heat dissipating structure 13, there are two blocks 132 in this embodiment. However, in other embodiment the number of blocks 132 may be decreased to one (not shown) by the user depending on the practical requirements of heat dissipation. Furthermore, both the number of first input holes 1321 and the number of first output holes 1322 of each block 132 are not limited to one, but may be more than one to increase the flow of liquid flowing through the blocks 132.

Next, the seal rings 14 will be described. Each of the seal rings 14 may surround the first input hole 1321 and the first output hole 1322 of one of the blocks 132; in other words, the openings of the first input hole 1321 and the first output hole 1322 are located within and surrounded by the seal ring 14. Thus, when one block 132 is stacked on a block 132 of another battery device 1 (see FIG. 4), a gap between the two stacked blocks 132 will be filled by the seal ring 14 so that the liquid flowing through the first input holes 1321 or the first output holes 1322 will not leak from the gap.

It shall be appreciated that the number of seal rings 14 corresponds to the number of blocks 132, so if the number of blocks 132 is decreased to one, then the number of seal rings 14 shall also be decreased to one.

So far, the battery device 1 of the first embodiment has been described.

Figure 4:
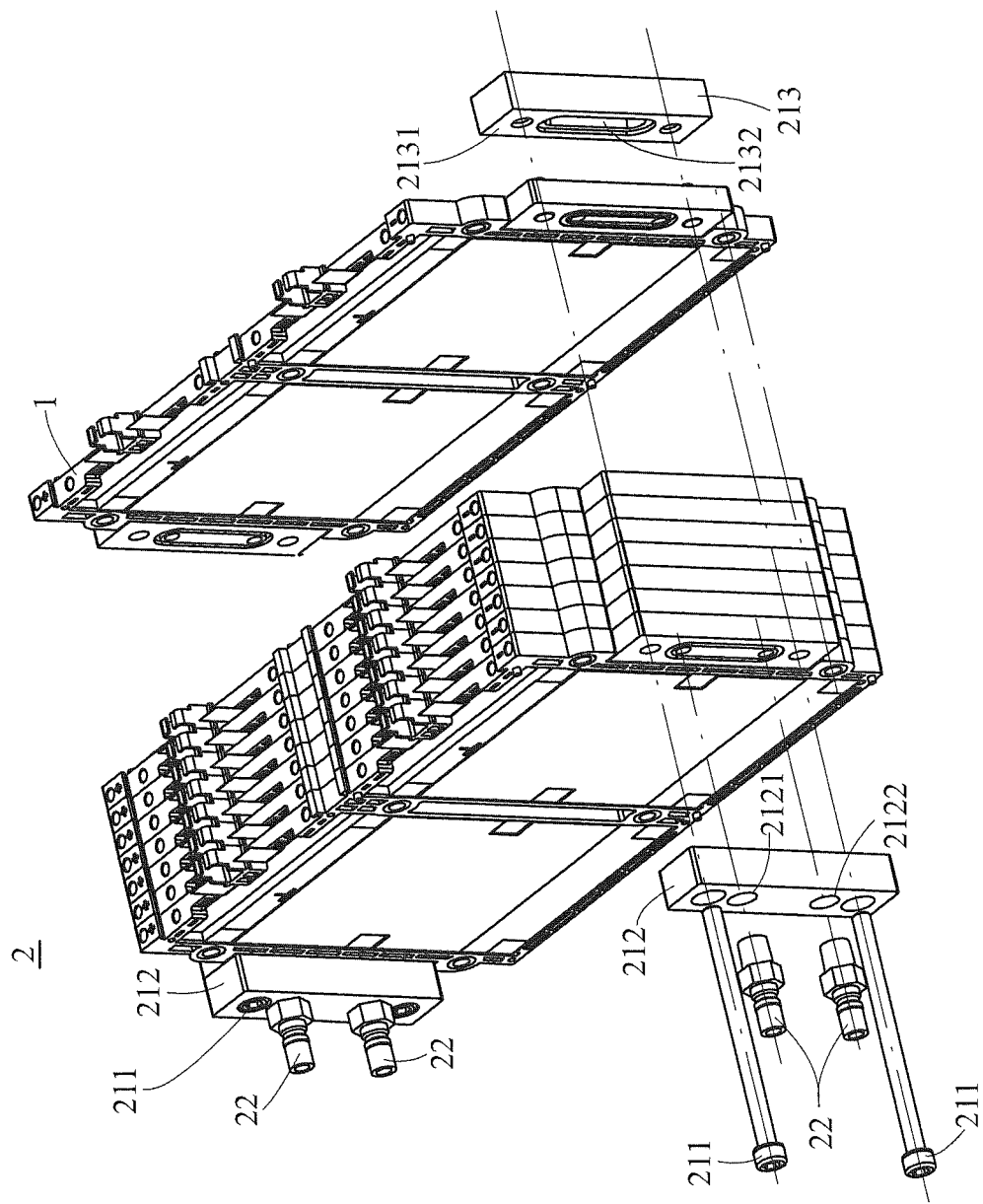
FIG. 4 is a perspective exploded view of a battery device module according to the second embodiment of the present invention.
Figure 5:
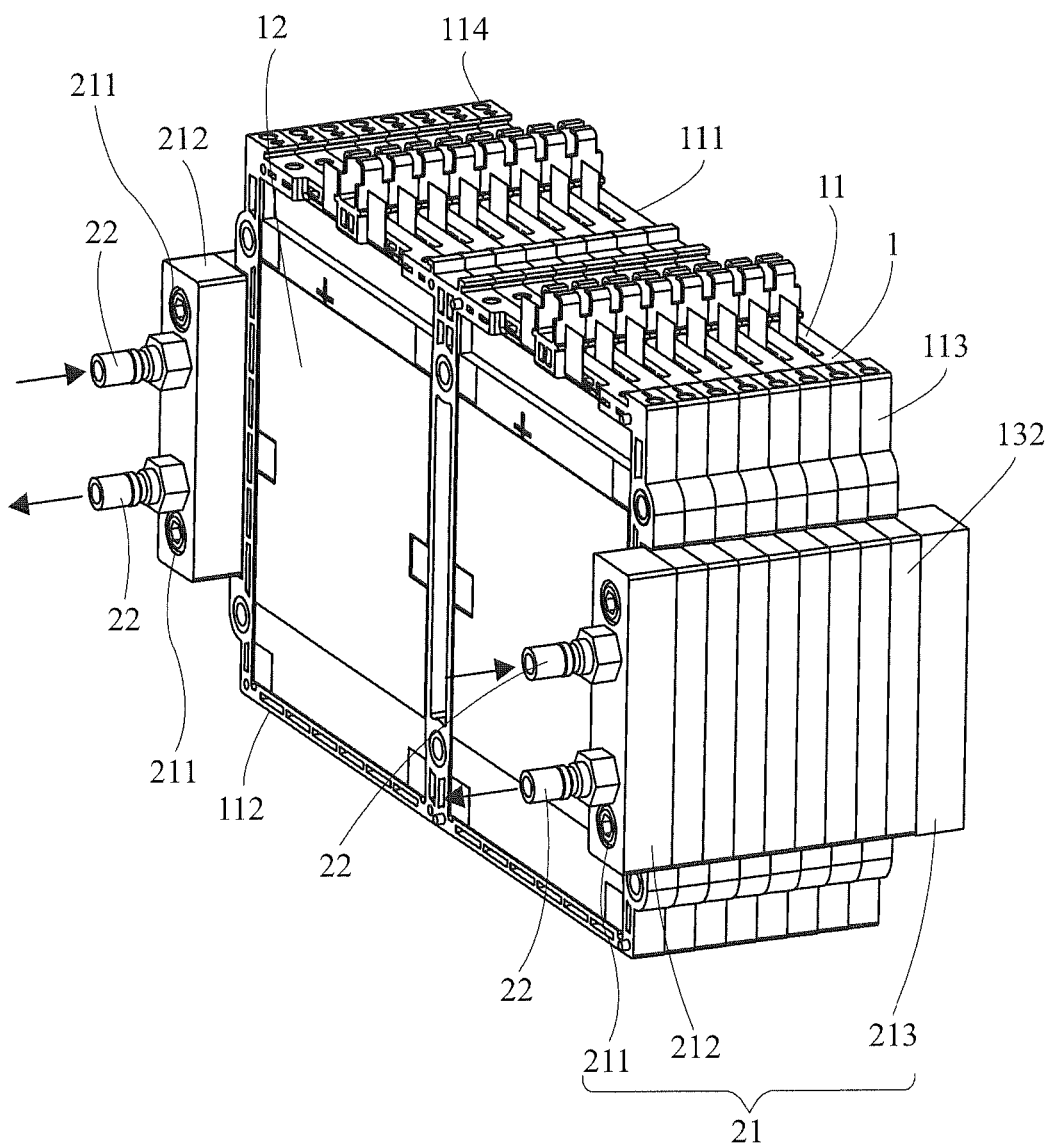
FIG. 5 is a perspective assembly view of the battery device module according to the second embodiment of the present invention.
Figure 6:
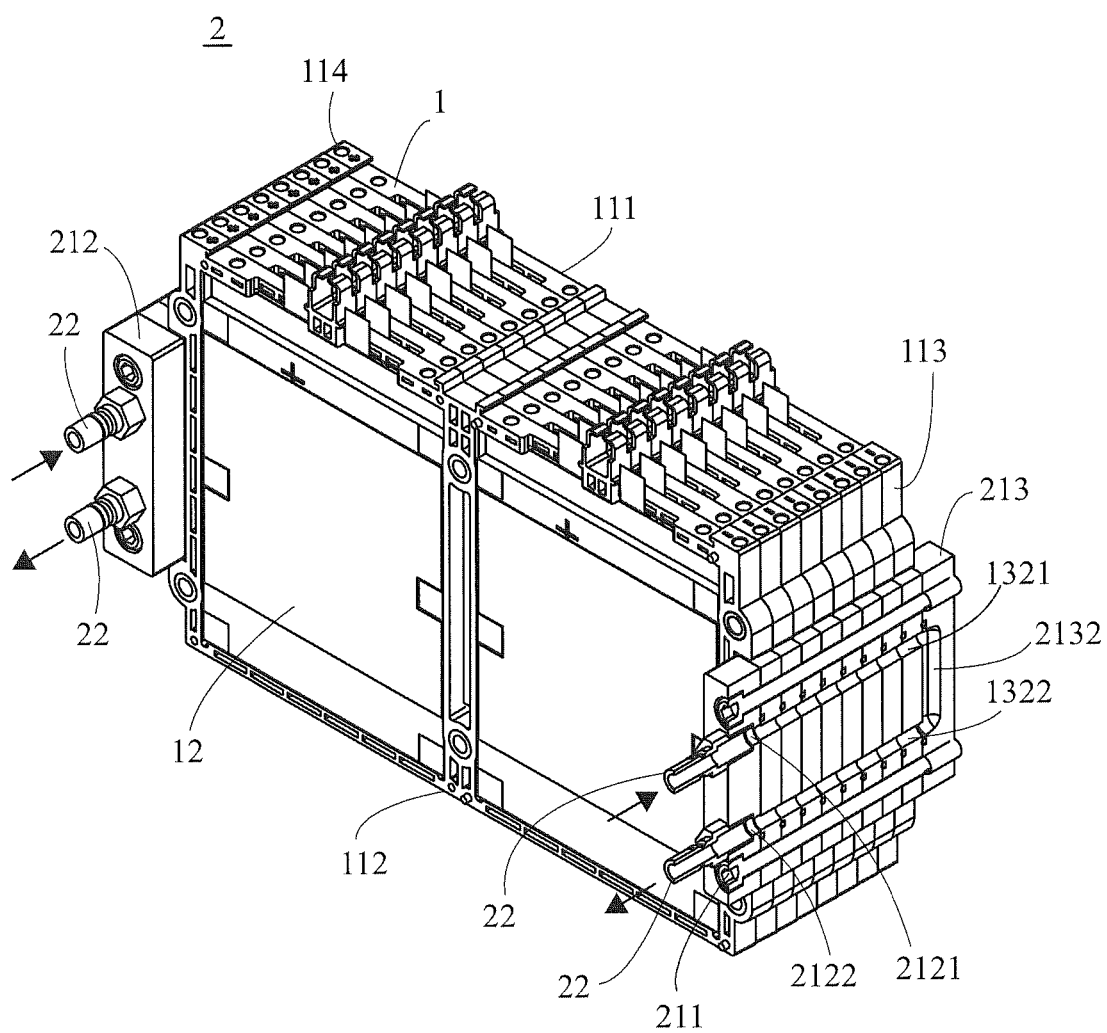
FIG. 6 is a perspective cross-sectional view of the battery device module according to the second embodiment of the present invention.

Referring to FIGS. 4 to 6, a perspective exploded view, a perspective assembly view and a perspective cross-sectional view of a battery device module 2 according to the second embodiment of the present invention are shown therein respectively. The battery device module 2 comprises a plurality of battery devices 1 as described in the first embodiment, a fixing device 21 and a plurality of adapters 22. Hereinbelow, these components will be described in sequence.

Referring to FIGS. 1 and 2 together, the battery devices 1 are stacked on top of each other along the axial direction of the first input hole 1321 or the first output hole 1322. After the battery devices 1 are stacked together, the plate 131 of the heat dissipating structure 13 of each battery device 1 will come into contact not only with the battery 12 of this battery device 1, but also with the battery 12 of an adjacent battery device 1; in other words, the plate 131 of each heat dissipating structure 13 will be sandwiched between the two batteries 12.

Furthermore, after the battery devices 1 are stacked together, the first input holes 1321 thereof communicate with each other and the first output holes 1322 thereof also communicate with each other so that the liquid can flow through the first input holes 1321 and the first output holes 1322 of the battery devices 1 continuously. Each seal ring 14 is sandwiched between the two blocks 132 so that the liquid flowing through the first input holes 1321 or the first output holes 1322 will not leak from the gap between the blocks 132.

Next, the fixing device 21 will be described. The fixing device 21 is adapted to apply a clamping force to the battery devices 1 so that the battery devices 1 stay stacked together without being separated from each other. The fixing device 21 comprises a plurality of screws 211, two first pressing blocks 212 and two second pressing blocks 213.

Each of the first pressing blocks 212 abuts on the block 132 of the first battery device 1, and each of the second pressing blocks 213 abuts on the block 132 of the last the battery device 1; in other words, the blocks 132 of the heat dissipating structures 13 are clamped between the first pressing blocks 212 and the second pressing blocks 213.

Each of the first pressing blocks 212 further comprises a third input hole 2121 that communicates with the first input holes 1321 and a third output hole 2122 that communicates with the first output holes 1322. Each of the second pressing blocks 213 further has an abutting plane 2131 abutting against the block 132 of the last heat dissipating structure 13; the abutting plane 2131 is formed with a groove 2132.

The groove 2132 communicates with the first input holes 1321 and the first output holes 1322. Thus, the liquid can flow from the third input hole 2121 into the first input holes 1321, then through the groove 2132 into the first output holes 1322, and finally flows out of the third output hole 2122.

The screws 211 connect the first pressing blocks 212 and the second pressing blocks 213 and pass through the heat dissipating structures 13 of the battery devices 1; in more detail, the heads of the screws 211 may press against the first pressing blocks 211, while the screw rods of the screws 211 may be threaded into threaded holes of the second pressing blocks 213. By increasing the feeding quantity of the screws 211, the distance between the first pressing blocks 212 and the second pressing blocks 213 can be shortened so that the heat dissipating structures 13 are clamped tightly into a close stack by the first pressing blocks 212 and the second pressing blocks 213.

The adapters 22 may be connected to the third input hole 2121 and the third output hole 2122 of the first pressing blocks respectively for the purpose of connection with water pipes (not shown). As a result, the liquid can be injected through a water pipe into the third input hole 2121 and then flow from the third output hole 2122 into another section of the water pipe. The adapters 22 may each be a quick adapter.

The battery device module 2 of this embodiment also utilizes flow of the liquid to quickly dissipate the heat generated by the batteries 12. In more detail, the heat generated by the batteries 12 is firstly transferred to the heat dissipating structures 13, and is then carried away by the liquid flowing through the first input holes 1321 and the first output holes 1322 of the heat dissipating structures 13 continuously. This makes it difficult for the heat to accumulate in the batteries 12 and the heat dissipating structures 13, thereby avoiding the temperature of the batteries 12 from rising too much.

Thus, the battery device module 2 of the second embodiment has been described. On the basis of the first embodiment and the second embodiment described above, other similar embodiments may also be devised by those skilled in the art, examples of which will be described as follows.

Figure 7:
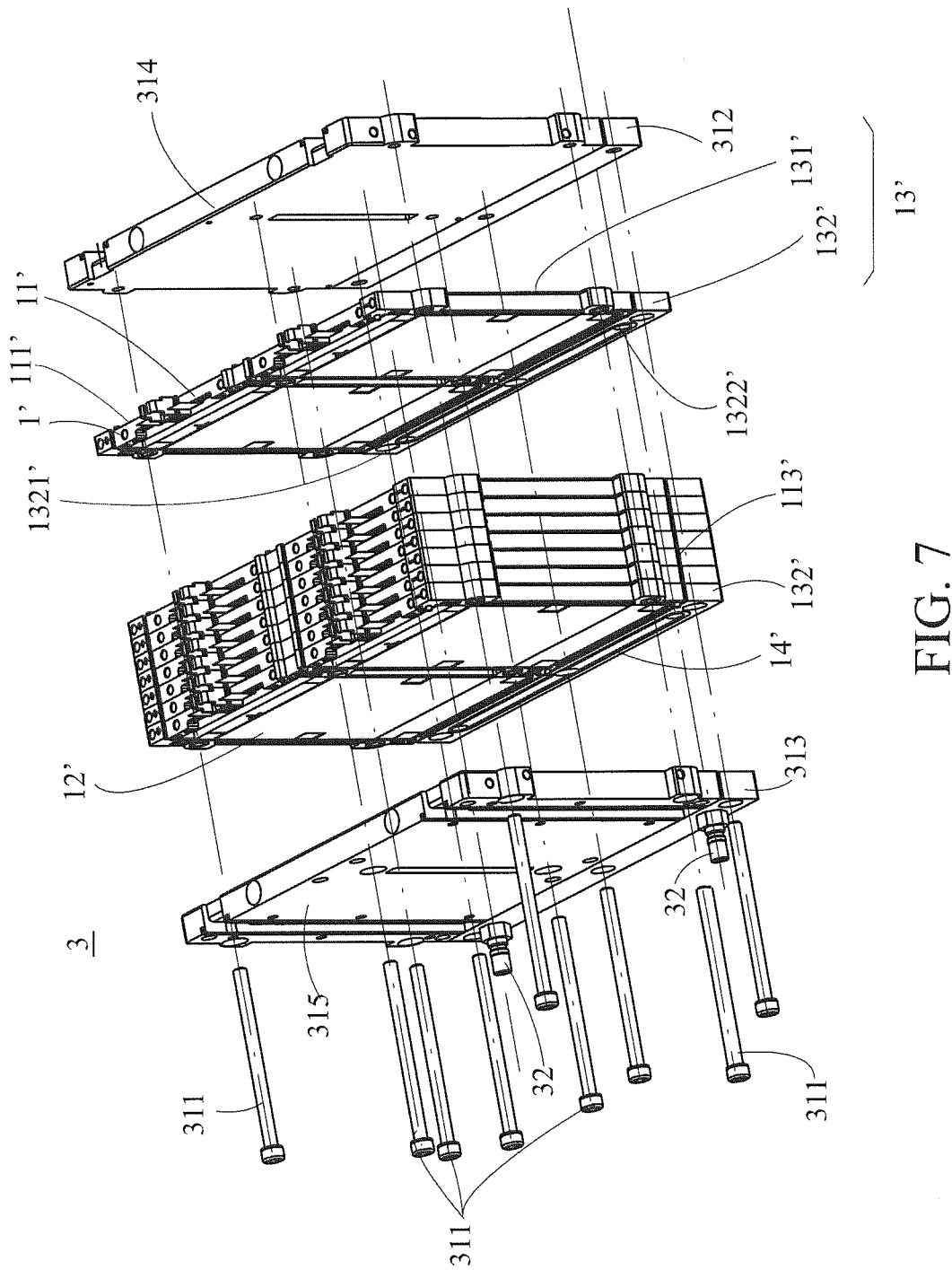
FIG. 7 is a perspective exploded view of a battery device module according to the third embodiment of the present invention.
Figure 8:
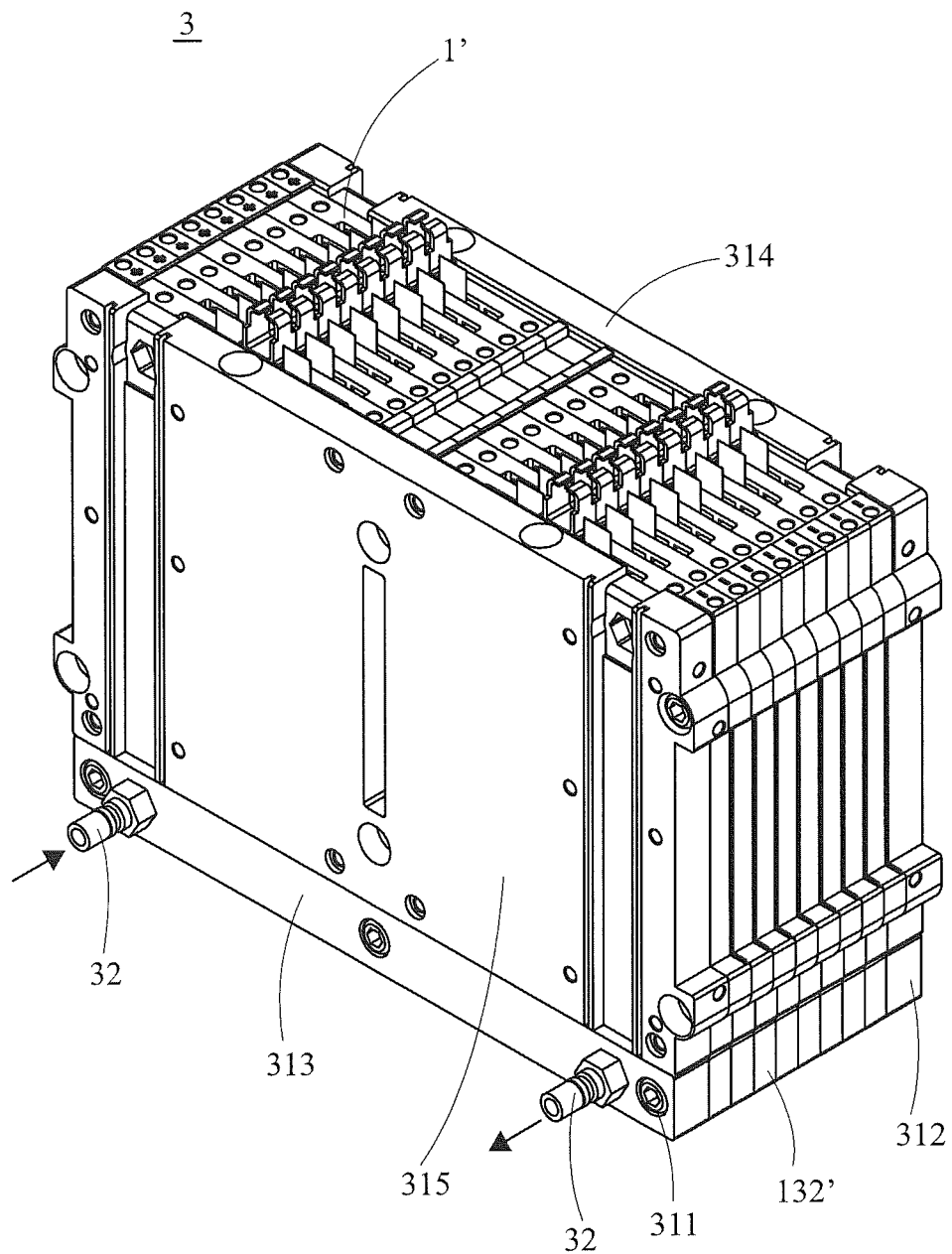
FIG. 8 is a perspective assembly view of the battery device module according to the third embodiment of the present invention.

Referring to FIGS. 7 and 8, a perspective exploded view and a perspective assembly view of a battery device module 3 according to the third embodiment of the present invention are shown therein respectively. The battery device module 3 comprises a plurality of battery devices 1', a fixing device and a plurality of adapters 32. Now, the differences between the battery device module 3 and the battery device module 2 of the second embodiment will be detailed, with similarities therebetween being only described briefly or omitted altogether.

Each of the battery devices 1' is similar to the battery device 1 of the first embodiment, but differs in that the third plane 113' of the fixing frame 11' of the battery device 1' is a bottom plane of the fixing frame 11'; in other words, the block 132' of the heat dissipating structure 13' of the battery device 1' is disposed on the bottom plane of the fixing frame 11' and below the fixing frame 11'. The battery devices 1' are stacked on top of each other.

The fixing device differs from the fixing device 21 of the second embodiment in that, in addition to the plurality of screws 311, first pressing blocks 312 and second pressing blocks 313, the fixing device further comprises a first pressing plate 314 and a second pressing plate 315. The stacked battery devices 1' are clamped between the first pressing plate 314 and the second pressing plate 315. Additionally, apart from passing through the heat dissipating structures 13', the screws 311 further pass through the fixing frames 11' and connect the first pressing plate 314 with the second pressing plate 315.

By increasing the feeding quantity of the screws 311, the distance between the first pressing plate 314 and the second pressing plate 315 can be shortened so that the battery devices 1' are clamped tightly into a close stack by the first pressing plate 314 and the second pressing plate 315.

Figure 9:
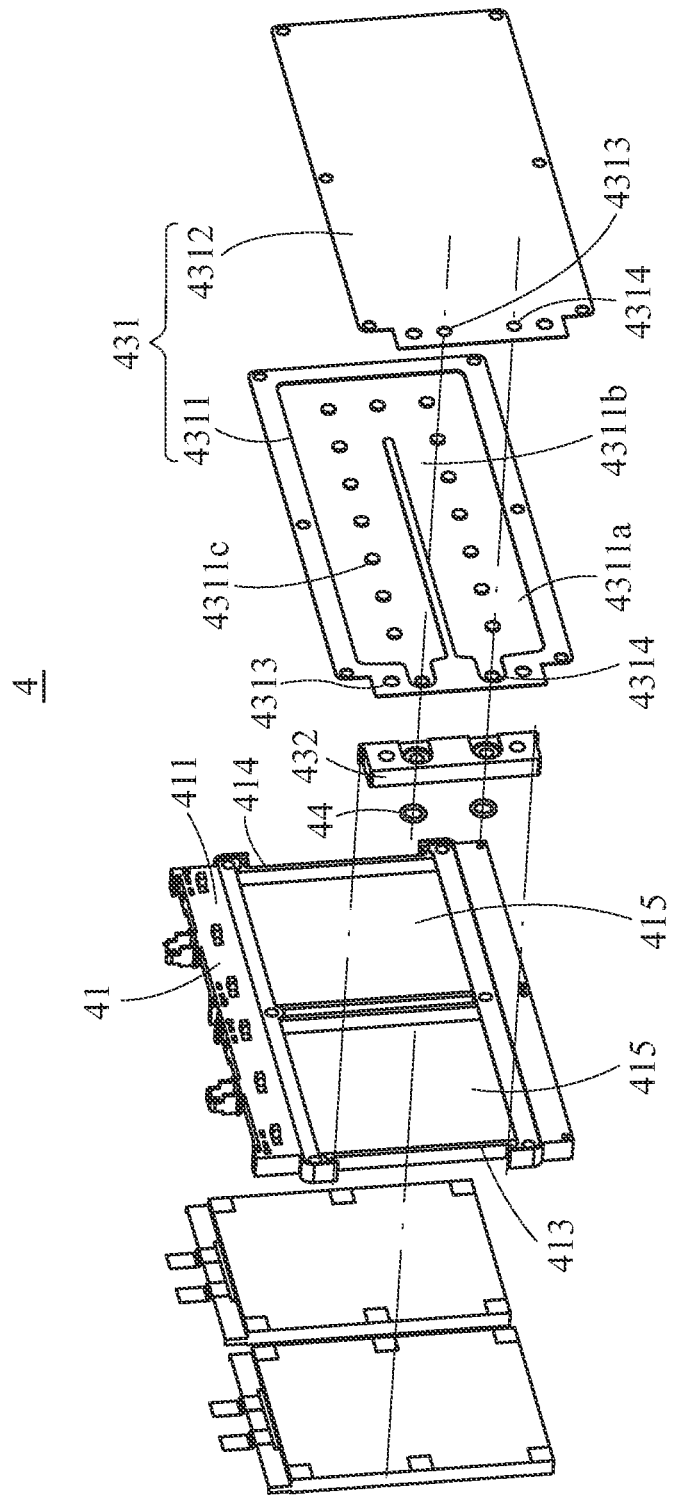
FIG. 9 is a perspective exploded view of a battery device according to the fourth embodiment of the present invention.
Figure 10:
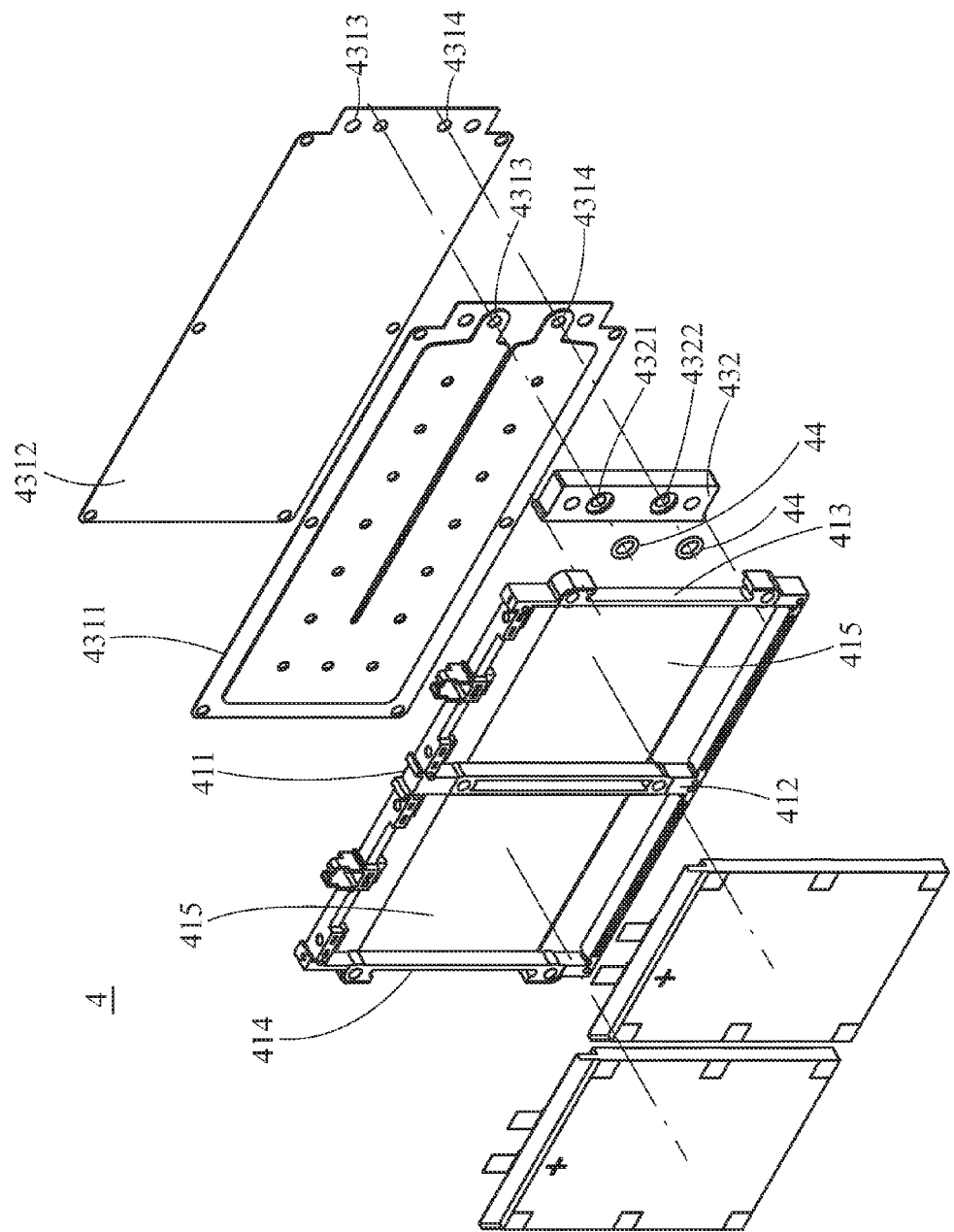
FIG. 10 is another perspective exploded view of the battery device according to the fourth embodiment of the present invention.
Figure 11:
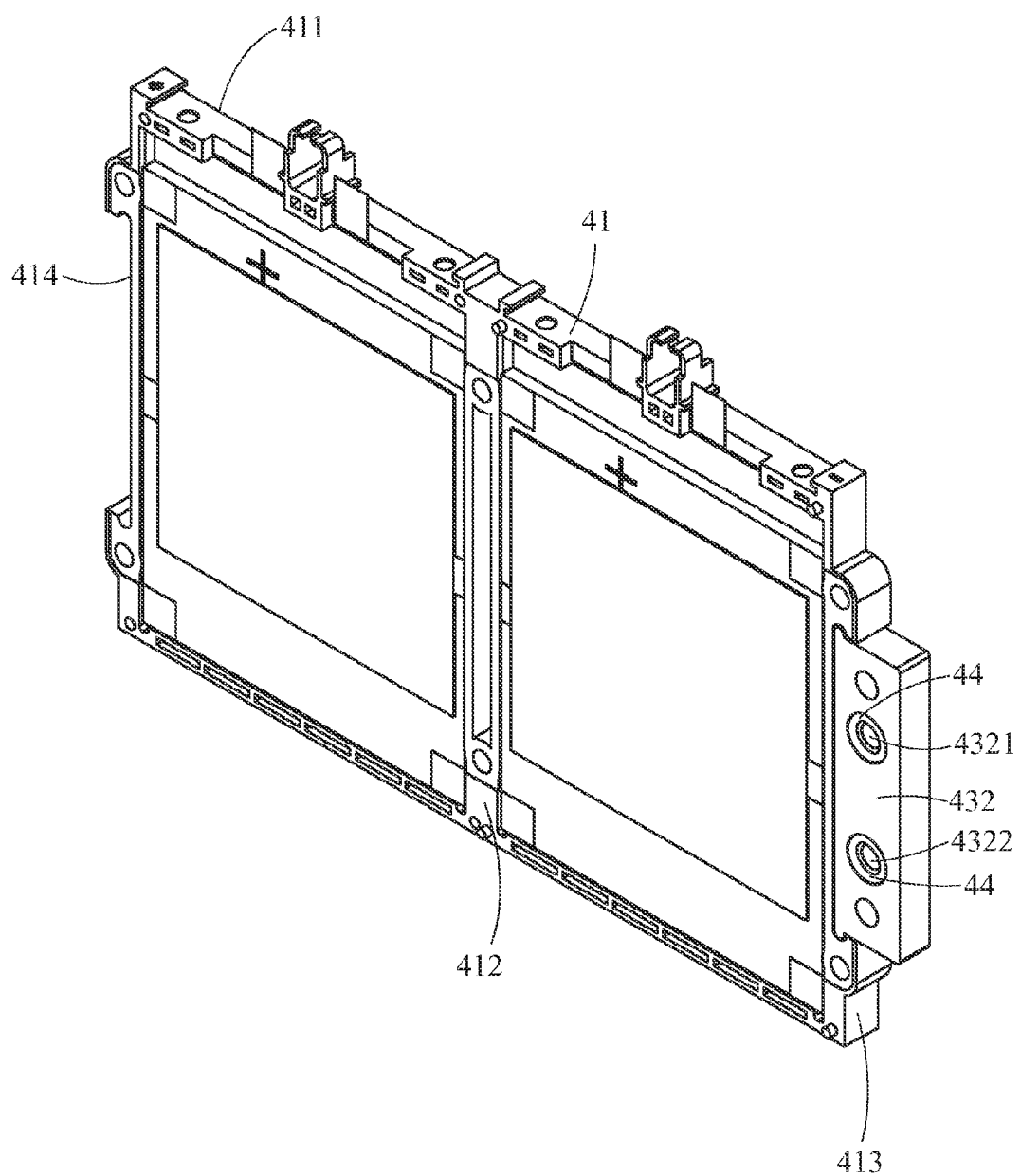
FIG. 11 is a perspective assembly view of the battery device according to the fourth embodiment of the present invention.

Referring to FIGS. 9 to 11, two perspective exploded views and a perspective assembly view of a battery device 4 according to the fourth embodiment of the present invention are shown therein respectively. The battery device 4 is similar to the battery device 1 of the first embodiment, but the heat dissipating structure of the battery device 4 differs from the heat dissipating structure 13 of the battery device 1.

In detail, the heat dissipating structure comprises a plate 431 and a block 432. However, the plate 431 and the block 432 are not formed integrally; instead, the block 432 is detachably disposed on the plate 431. The block 432 has a first input hole 4321 and a first output hole 4322. The plate 431 has a second input hole 4313 that communicates with the first input hole 4321 and a second output hole 4314 that communicates with the first output hole 4322.

Furthermore, the plate 431 is formed by a first sub-plate 4311 and a second sub-plate 4312. The first sub-plate 4311 and the second sub-plate 4312 may be fixed together closely through welding or gluing. A liquid channel 4311b is formed in the plate 431 on the inner plane 4311a of the first sub-plate 4311.

Figure 12:
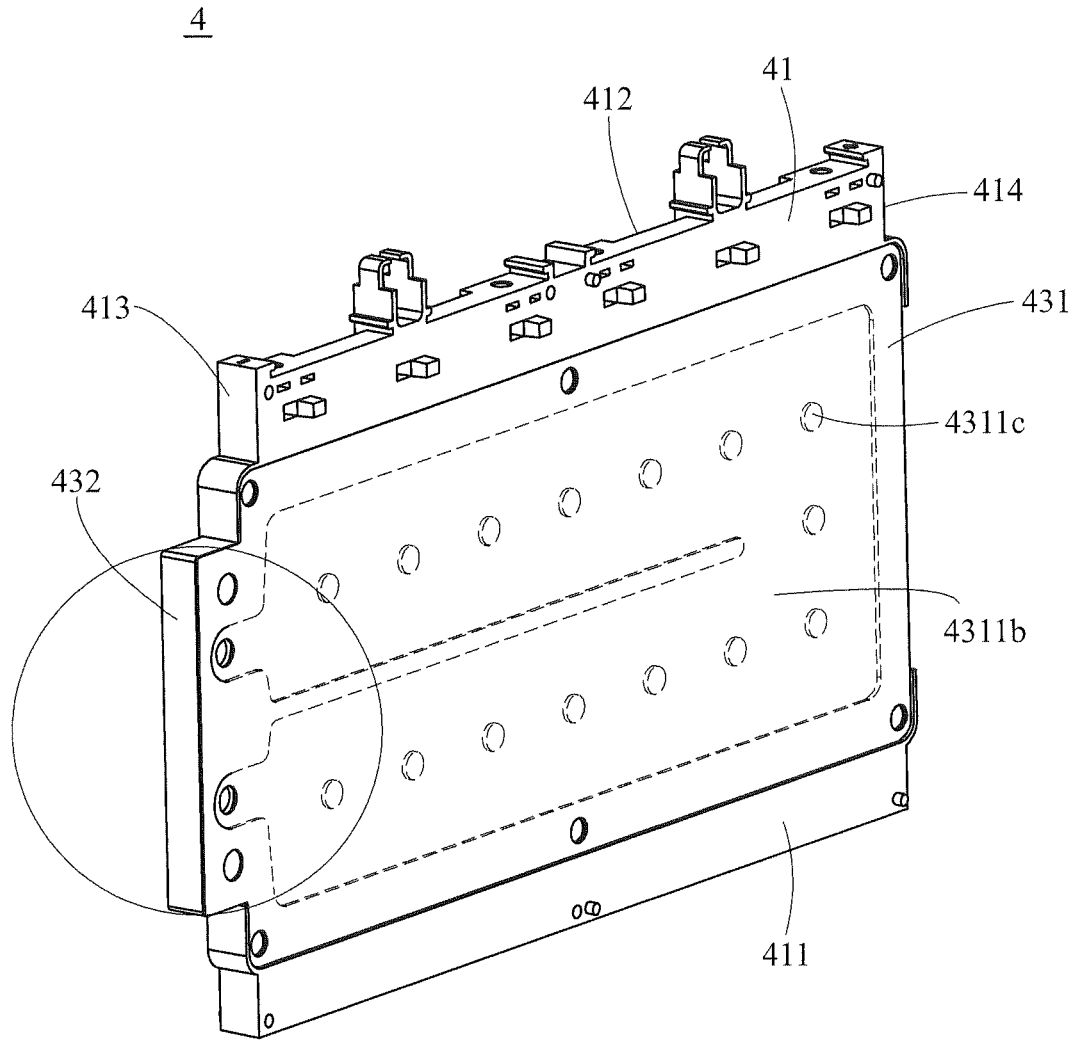
FIG. 12 is another perspective assembly view of the battery device according to the fourth embodiment of the present invention.
Figure 13:
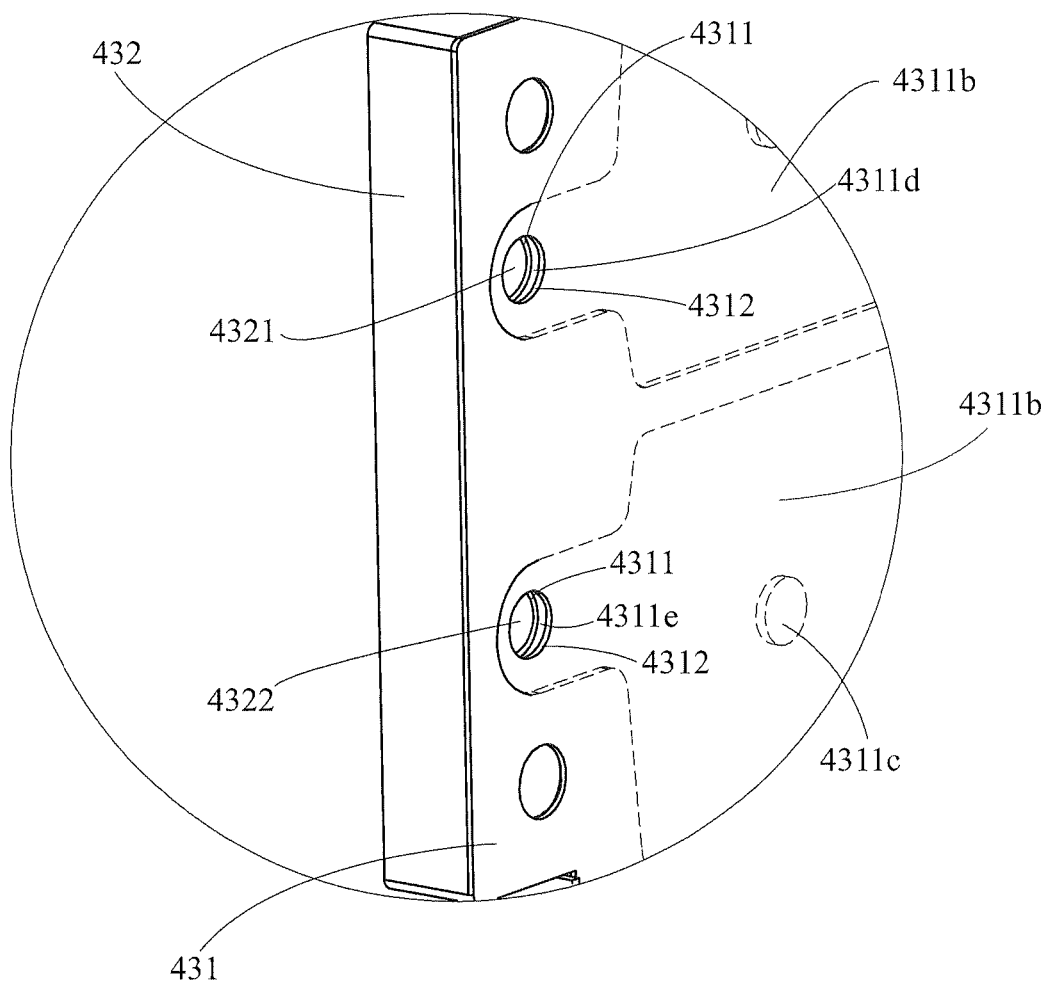
FIG. 13 is a partially enlarged view of the battery device according to the fourth embodiment of the present invention.

Referring to both FIGS. 12 and 13, a perspective assembly view and a partially enlarged view of the battery device 4 according to the fourth embodiment of the present invention are shown therein respectively. The liquid channel 4311b has an input opening 4311d and an output opening 4311e for the liquid to flow into or out of the liquid channel 4311b. The input opening 4311d is disposed in the second input hole 4313 while the output opening 4311e is disposed in the second output hole 4314 so that the first input hole 4321 communicates with the input opening 4311d and the first output hole 4322 communicates with the output opening 4311e.

Thus, the liquid can flow from the first input hole 4321 to the second input hole 4313, and then through the input opening 4311d into the liquid channel 4311b. The liquid flows along the liquid channel 4311b and then flows out of the output opening 4311e into the second output hole 4314 and the first output hole 4322.

It is noting that the liquid channel 4311b is a U-shaped channel in this embodiment; in other words, the liquid channel 4311b has only one turning portion. This makes the resistance to flow of the liquid in the liquid channel 4311b small. However, in other embodiments (not shown), it is also possible that the liquid channel 4311b has more than one turning portion.

Referring back to both FIGS. 9 and 10, the plate 431 may also have a plurality of embossments 4311c. The embossments 4311c protrude from an inner plane 4311a of the first sub-plate 4311 and are dispersively disposed in the liquid channel 4311b. The embossments 4311c are adapted to support the first sub-plate 4311 and the second sub-plate 4312 so that the first sub-plate 4311 and the second sub-plate 4312 are less likely to deform because of being compressed.

In this embodiment, each of the embossments 4311c is a circular embossment. In other embodiments (not shown), each of the embossments 4311c may be a streamlining embossment, in which case it is less likely to generate a turbulence when the liquid flows through the embossments 4311c, thus reducing the occurrence of air bubbles.

As compared to the heat dissipation structure 13 of the first embodiment, the heat dissipation structure of this embodiment delivers a better heat dissipation effect because the liquid can further flow in the plate 431 of the heat dissipating structure to carry the heat away.

Figure 14:
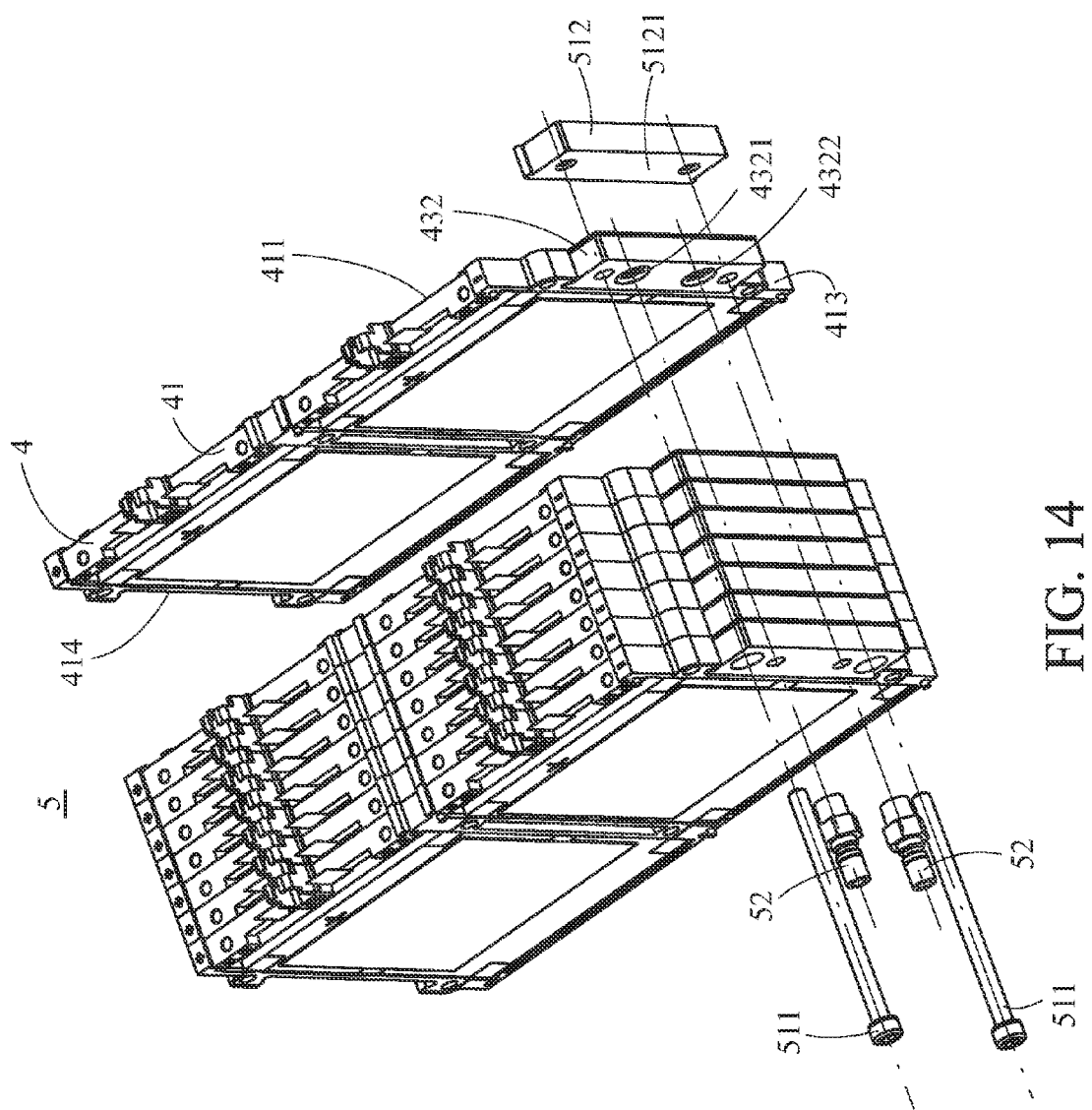
FIG. 14 is a perspective exploded view of a battery device module according to the fifth embodiment of the present invention.
Figure 15:
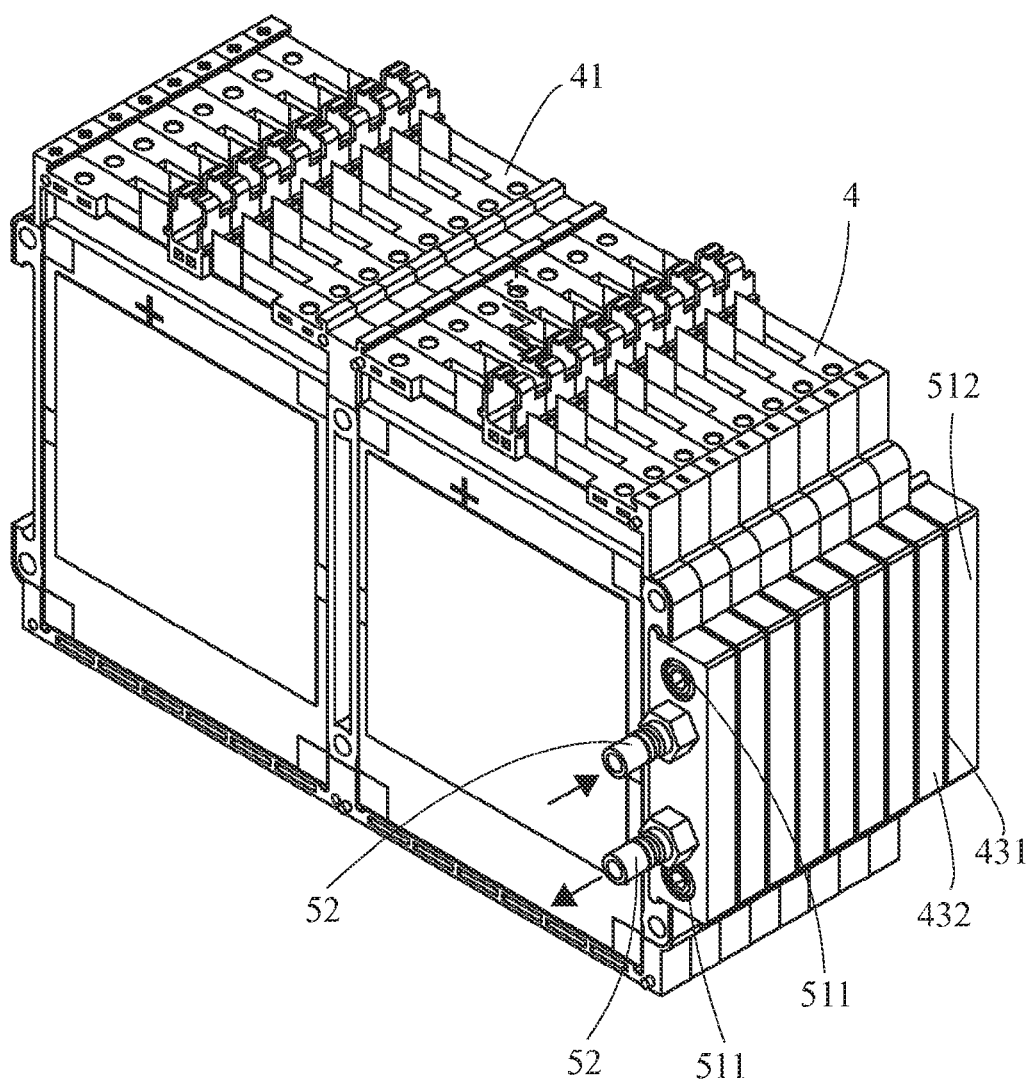
FIG. 15 is a perspective assembly view of a battery device module according to the fifth embodiment of the present invention.

Referring to FIGS. 14 and 15, a perspective exploded view and a perspective assembly view of a battery device module 5 according to the fifth embodiment of the present invention are shown therein respectively. The battery device module 5 comprises a plurality of battery devices 4 described in the fourth embodiment, a fixing device and two adapters 52.

The battery devices 4 are stacked on top of each other. The first input holes 4321 of the battery devices 4 communicate with each other, and the first output holes 4322 of the battery devices 4 also communicate with each other. The two adapters 52 connect with the first input hole 4321 and the first output hole 4322 of the first one of the battery devices 4 respectively.

The fixing device is adapted to provide a clamping force for the battery devices 4 to stay stacked on top of each other. The fixing device comprises a plurality of screws 511 and a first pressing block 512. The screws 511 are adapted to pass through the heat dissipating structures of the battery devices 4 with heads of the screws 511 abutting against the heat dissipating structure of the first battery device 4. The first pressing block 512 abuts against the heat dissipating structure of the last battery device 4 and is connected to the screws 511 by means of thread.

Additionally, the abutting plane 5121 of the first pressing block 512 is not formed with a groove but is a flat plane, so it is difficult for the liquid flowing through the first input hole 4321 to flow through the first pressing block 512 into the first output hole 4322; and instead, the liquid is forced into the liquid channel 4311b.

Thereby, the battery device module 5 also allows the liquid to flow therethrough to carry the heat away from the battery device module 5, thus avoiding the temperature of the battery device module 5 from rising too much.

According to the above descriptions, the battery device and the battery device module of the present invention have at least the following features:

1. the heat dissipating structure allows liquid to flow therethrough to carry the heat away from the battery device or the battery device module, thus decreasing the temperature of the battery device and the battery device module;

2. the thickness of the block(s) of the heat dissipating structure is not larger than the thickness of the fixing frame, so the battery device will not be made thicker due to the disposition of the block(s);

3. the heat dissipating structure can be easily installed onto the fixing frame;

4. the plate of the heat dissipating structure has embossments formed thereon to improve the structural strength of the plate that has been degraded due to the formation of the liquid channel; and 5. the liquid channel of the plate may be formed as a U-shaped channel to reduce resistance to the flow of the liquid in the liquid channel.

The above disclosure is related to the detailed technical contents and inventive features thereof. People skilled in this field may proceed with a variety of modifications and replacements based on the disclosures and suggestions of the invention as described without departing from the characteristics thereof Nevertheless, although such modifications and replacements are not fully disclosed in the above descriptions, they have substantially been covered in the following claims as appended.

What is claimed is:

1. A battery device, comprising:
a fixing frame, having a first plane, a second plane and a third plane, wherein the first plane stands apart from the second plane, the third plane connects the first and the second planes, and a receiving space is formed between the first and the second planes;
a battery, disposed in the receiving space of the fixing frame; and
a heat dissipating structure, including a plate and a block on each of opposing sides of the plate, wherein the plate is thinner than the blocks and disposed on the second plane, and each of the blocks is disposed on the third plane of the fixing frame and each of the blocks has a first input hole and a first output hole.

2. The battery device as claimed in claim 1, wherein a thickness of the block is not larger than a thickness of the fixing frame.

3. The battery device as claimed in claim 1, wherein the plate and the block are formed integrally.

4. The battery device as claimed in claim 1, further comprising a seal ring, which surrounds the first input hole or the first output hole.

5. The battery device as claimed in claim 1, wherein the block is detachably stacked on the plate.

6. The battery device as claimed in claim 5, wherein the plate has a second input hole communicating with the first input hole and a second output hole communicating with the first output hole.

7. The battery device as claimed in claim 6, wherein a liquid channel is formed in the plate and has an input opening and an output opening, the input opening is disposed in the second input hole and the output opening is disposed in the second output hole so that the first input hole communicates with the input opening and the first output hole communicates with the output opening.

8. The battery device as claimed in claim 7, wherein the plate has a plurality of embossments disposed in the liquid channel.

9. The battery device as claimed in claim 8, wherein each of the embossments is a circular embossment or streamlining embossment.

10. The battery device as claimed in claim 7, wherein the plate is formed by a first sub-plate and a second sub-plate, and the liquid channel is formed on an inner plane of the first sub-plate.

11. The battery device as claimed in claim 1, wherein the heat dissipating structure is made of aluminum.

12. A battery device module, comprising:
- a plurality of battery devices as claimed in claim 1, wherein the battery devices are stacked on each other, the first input holes of the battery devices communicate with each other, and the first output holes of the battery devices communicate with each other; and
- a fixing device, providing a clamping force for the battery devices to stay stacked on each other.

13. The battery device module as claimed in claim 12, wherein the fixing device comprises a plurality of screws, a first pressing block and a second pressing block, the heat dissipating structures are held between the first pressing block and the second pressing block, and the screws connect the first and the second pressing blocks and pass through the heat dissipating structures.

14. The battery device module as claimed in claim 13, wherein the first pressing block comprises a third input hole and a third output hole, the third input hole communicates with the first input holes and the third output hole communicates with the first output holes.

15. The battery device module as claimed in claim 14, further comprising a plurality of adapters, which connect with the third input hole and the third output hole of the first pressing block respectively.

16. The battery device module as claimed in claim 13, wherein the second pressing block has an abutting plane abutting against the heat dissipating structure, and the abutting plane is formed with a groove communicating with the first input holes and the first output holes.

17. The battery device module as claimed in claim 12, wherein the fixing device comprises a plurality of screws passing through the fixing frames and the heat dissipating structures.

* * * * *